United States Patent [19]

Maeda

[11] 4,054,291
[45] Oct. 18, 1977

[54] TURNTABLE ASSEMBLY FOR PHONOGRAPH RECORDS

[75] Inventor: Keijiro Maeda, Yokohama, Japan

[73] Assignee: Sony Corporation, Tokyo, Japan

[21] Appl. No.: 566,537

[22] Filed: Apr. 8, 1975

[30] Foreign Application Priority Data

Apr. 16, 1974   Japan   ............................. 49-43404[U]

[51] Int. Cl.$^2$ ............................................... G11B 3/60
[52] U.S. Cl. .............................. 274/39 R; 248/358 R; 267/141
[58] Field of Search .................. 267/140, 141, 153; 248/22, 358; 274/39

[56] References Cited

U.S. PATENT DOCUMENTS

| | | | |
|---|---|---|---|
| 778,492 | 12/1904 | Johnson | 274/39 R |
| 1,480,629 | 1/1924 | Nolen | 274/39 |
| 1,917,633 | 7/1939 | Burt | 274/39 A |
| 3,231,454 | 1/1966 | Williams | 206/521 |
| 3,720,415 | 3/1973 | Daniels et al. | 274/39 A |
| 3,831,923 | 8/1974 | Meldrum | 267/153 |

FOREIGN PATENT DOCUMENTS

294,216   5/1932   Italy ....................................... 248/22

Primary Examiner—Richard E. Aegerter
Assistant Examiner—John W. Shepperd
Attorney, Agent, or Firm—Lewis H. Eslinger; Alvin Sinderbrand

[57] ABSTRACT

A phonograph record turntable assembly comprises a rotatable turntable having on its upper surface a plurality of elastically flexible, upwardly dished record support members which are engageable, at their peripheries with the undersurface of a phonograph record for each defining an enclosed space therebetween, and each record support member has at least one air passage opening from the respective enclosed space to the atmosphere. When a warped or distorted phonograph record is placed on the aforesaid turntable assembly, the several elastically flexible support members conform to the shape of the undersurface of the record for uniformly supporting the latter, and vibrations of the record are damped by the viscous resistance to flow of air through the air passages of the record support members into and out of the enclosed spaces defined between such support members and the phonograph record.

9 Claims, 9 Drawing Figures

TURNTABLE ASSEMBLY FOR PHONOGRAPH RECORDS

BACKGROUND OF THE INVENTION

1. Field of the Invention

This invention relates generally to a turntable assembly for phonograph records, and more particularly is directed to improvements in the means by which the phonograph records are supported on the rotatable turntable of a phonograph record player.

2. Description of the Prior Art

Phonograph pickup cartridges are being continuously improved by being made lighter in weight and capable of playing or reproducing phonograph records with decreased vertical contact pressures of the stylus in the record groove. For example, cartridges are presently available that can play phonograph records quite well with a vertical contact force of only one-half gram, and it is anticipated that, in the near future, cartridges will be available to play phonograph records with a vertical contact force of only about one-tenth gram. When using such cartridges, it is important that some means be provided to permit the playing of phonograph records that are not perfectly flat, that is, records that are warped or distorted from a flat plane. Since phonograph records are made of plastic materials which deform under continuous stress and exposure to elevated temperatures, such phonograph records may become distorted or warped either by reason of improper manufacture or because they are not stored under ideal conditions. When a warped or distorted phonograph record is placed on an existing turntable, the undersurface of the record does not contact the surface of the turntable over its entire area so that gaps or spaces are left between the record and turntable with the result that the record is at least partly in a floating or unstable condition. During reproduction of the recorded signals of such a distorted or warped record, the tracking of the needle or stylus of the cartridge in the record groove and generates considerable forces which react on the phonograph record. Due to the unstable floating conditions of the warped record, such forces are apt to produce vertical vibration of the record at a resonance frequency of the latter. Accordingly, the frequency characteristics of the reproduced signal are disturbed, particularly in the vicinity of such resonance frequency, and such disturbance of the frequency characteristics cannot be corrected or removed even though the remainder of the sound reproducing system, such as, the turntable, pickup arm, amplifier and speakers may be components of high quality. The foregoing problems are particularly disturbing in the case of the reproduction of stereo records in which vertical vibrations of the stylus are intended to correspond to right-left difference signals. By reason of the vertical vibrations of a warped or distorted record at its resonance frequency, sounds which originated at the center may be displaced toward the right and left in the reproduced stereophonic sounds so that the stereophonic effect is distorted.

Although conventional phonograph record turntables are usually provided with a rubber mat having concentric circular grooves or ridges on its upper surface, such rubber mats are obviously not adapted to ensure uniform supporting contact with the undersurface of a record over the entire area of the latter when the record is substantially warped or distorted. Further, although the existing rubber mats on phonographic record turntables are intended to absorb vibrations transmitted to the turntable, for example, by the drive assembly for the latter, such rubber mats do not fully absorb or damp the vibrations which are, at least to some extent, transmitted to the record and then picked up by the cartridge so as to be reproduced as corresponding noise signals.

OBJECTS AND SUMMARY OF THE INVENTION

Accordingly, it is an object of this invention to provide a phonograph record turntable assembly by which a phonograph record supported thereon is restrained from vibrating so that signals recorded on the record can be very accurately reproduced without distortion even though the record is warped and reproduction is effected with a cartridge having a very low contact pressure thereagainst.

Another object is to provide a phonograph record turntable assembly which is capable of close supporting contact with a phonograph record even though the latter is substantially warped or deformed from a flat plane.

A further object is to provide a phonograph record turntable assembly, as aforesaid, which is effective to damp vibrations generated by a drive source for the turntable or resulting from external shocks or impacts to which the turntable or its supporting cabinet may be subjected, so that such vibrations are not transmitted to a phonograph record supported on the turntable and the inclusion of resulting noises in the reproduced signals is avoided.

In accordance with an aspect of this invention, the turntable of a phonograph record player is provided, on its upper surface, with a plurality of elastically flexible record support members which are preferably upwardly dished so as to be engageable at their peripheries with the undersurface of a phonograph record even if the latter is substantially warped, whereby to uniformly support the record on the turntable. Further, by reason of their upwardly dished configuration, each record support member and the portion of the record engaged therewith define an enclosed space therebetween which opens to the atmosphere through at least one air passage in the record support member, so that the viscous resistance to air flow through each such passage is effective to damp any vibrations that might otherwise be transmitted to the phonograph record.

The above, and other objects, features and advantages of the invention, will be apparent in the following detailed description of illustrative embodiments thereof which is to be read in conjunction with the accompanying drawings.

DESCRIPTION OF THE PREFERRED EMBODIMENTS

Figure 1:
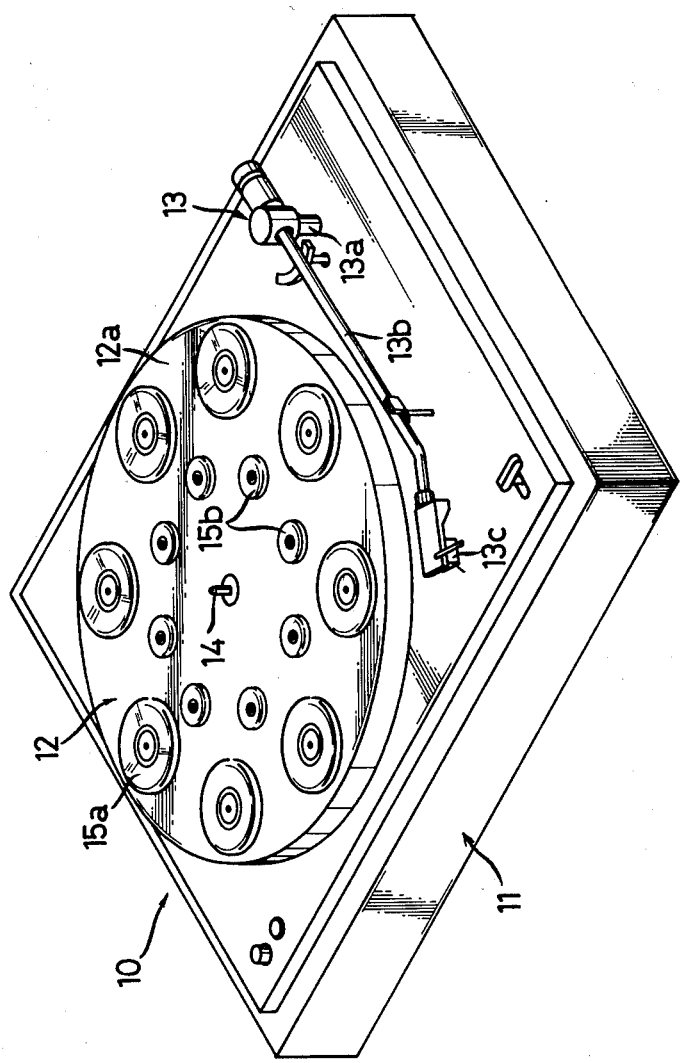
FIG. 1 is a perspective view of a phonograph record player provided with a turntable assembly for phonograph records according to one embodiment of this invention.

Referring to the drawings in detail, and initially to FIG. 1 thereof, it will be seen that the present invention is there shown applied to a phonograph record player 10 which, as is usual, generally comprises a cabinet 11 containing a drive mechanism (not shown) for a turntable assembly 102 rotatably mounted on the cabinet, and a tone arm assembly 13 for reproducing signals recorded on a phonograph record (not shown) when the latter is rotatably supported on turntable assembly 12. The tone arm assembly 13 is shown to comprise the usual tone arm 13b which is swingably mounted on cabinet 11 by way of a shaft 13a, and which carries a cartridge 13c at its free end.

The turntable assembly 12 comprises the usual circular turntable 12a of aluminum or any other suitable material which is rotatable about a centrally located spindle 14, and which, in accordance with this invention, is provided, on its upper surface, with a plurality of elastically flexible record support means 15a and 15b for supporting a phonograph record on turntable 12a. Such record support means 15a and 15b are each adapted to cooperate with the undersurface of a phonograph record supported thereon for defining an enclosed space therebetween, and each record support means is further formed to define at least one air passage through which such enclosed space communicates with the atmosphere.

Figure 2:
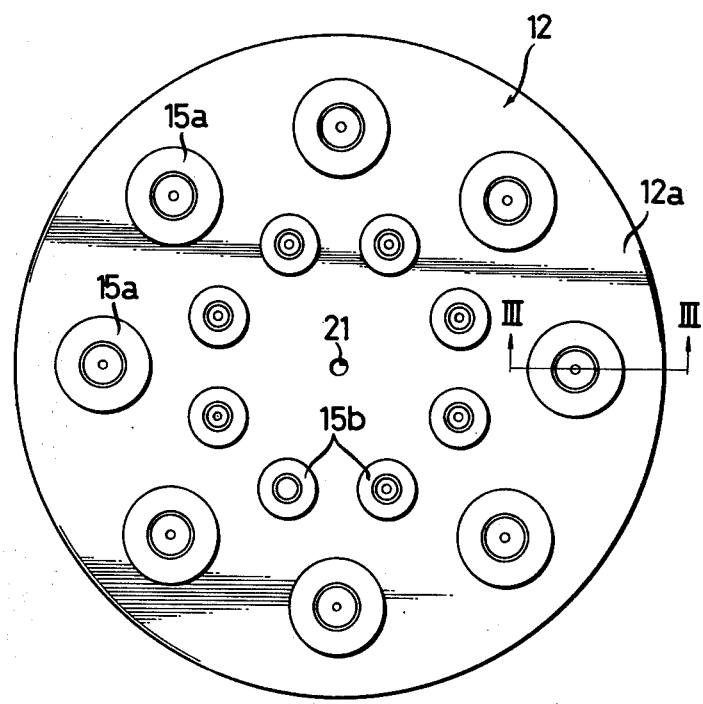
FIG. 2 is a plan view of the turntable assembly shown on FIG. 1.

More particularly, as shown on FIGS. 1 and 2, the elastically flexible record support means 15a and 15b may be constituted by circular, upwardly dished record support members of relatively larger and smaller diameters, respectively, and are arranged in outer and inner circular arrays, respectively, which are concentric with a central hole 21 (FIG. 2) provided in turntable 12a for receiving spindle 14. Further, the record support members 15b of the inner circular array are preferably staggered, in the circumferential direction of turntable 12a, relative to the record support members 15a of the outer circular array.

Figure 3:
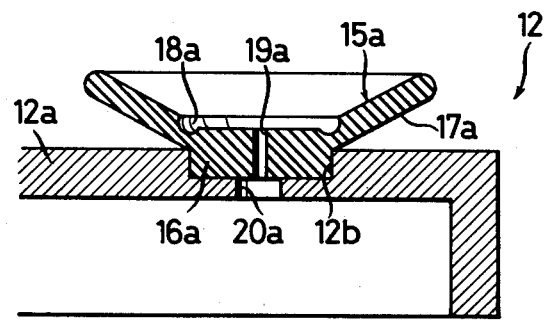
FIG. 3 is an enlarged, fragmentary cross-sectional view taken along the line III—III on FIG. 2.

Referring now to FIG. 3, it will be seen that each of the upwardly dished record support members 15a formed, for example, of natural or synthetic rubber or any other suitably elastically flexible material, may include a relatively thick, central lower portion 16a and a relatively thin, raised peripheral portion flaring upwardly from central portion 16a so as to provide member 15a with a configuration similar to that of a suction cup. The lower portion 16a of each record support member 15a is suitably secured to turntable 12a so that the peripheral portion 17a will extend upwardly from the latter. For example, as shown, the upper surface of turntable 12a may be formed with a circular recess 12b for each record support member 15a with each circular recess 12b being diametrically dimensioned so that lower central portion 16a of the respective record support member can be fitted therein under compression and thereafter frictionally retained within recess 12b. Alternatively, the central lower portion 16a of each record support member 15a may be secured on turntable 12a by adhesive or by a screw (not shown) extending through portion 16a into the turntable.

An annular groove 18a is preferably formed in the upwardly facing surface of each record support member 15a adjacent the root of its peripheral portion 17a so as to increase the compliance or flexibility of such peripheral portion. Further, at least one bore 19a extends axially through central lower portion 16a and communicates with a hole 20a opening from the bottom of recess 12b to the undersurface of turntable 12a.

Figure 4:
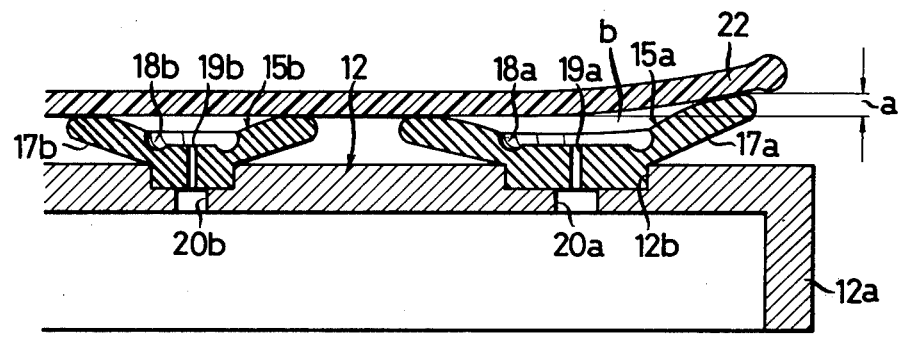
FIG. 4 is an enlarged partial cross-sectional view of the turntable assembly shown on FIG. 1, with a phonograph record being shown mounted on the turntable assembly.

As shown on FIG. 4, each of the record support members 15b may be identical to the previously described record member 15a, with the exception of its diametrical dimensions, and has its several parts identified by the same reference numerals used in the above description of record support member 15a, but with the reference letter "b" appended thereto.

When a phonograph record 22 (FIG. 4) is placed on the turntable assembly 12 according to this invention, the undersurface of such record is engaged and supported by the peripheral portions 17a and 17b of the elastically flexible record support members 15a and 15b. Since the compliance or elastic flexibility or peripheral portions 17a and 17b is relatively great, the weight of phonograph record 22 causes such peripheral portions 17a and 17b to spread out so that, even if phonograph record 22 is warped, for example, has a portion of its outer periphery distorted upwardly by a distance $a$ from the plane of the remainder of the record, the several record support members 15a and 15b are suitably deformed for ensuring contact of all of the record support members 15a and 15b with the undersurface of the phonograph record. Accordingly, the phonograph record is mounted in a stable manner on turntable assembly 12, with an enclosed space $b$ being defined between each of the record support members 15a and 15b and the respective portion of the undersurface of record 22.

To the extent that vibrations are generated in phonograph record 22 in response to the rotation of turntable 12a and the reproduction of signals from the record 22 by cartridge 13c, such vibrations are partly absorbed by the cushioning effect of the elastically flexible peripheral portions 17a and 17b of record support members 15a and 15b. Further, such vibrations tend to increase and decrease the volumes of the enclosed spaces $b$ with the result that air tends to flow into and out of such enclosed spaces through the respective air passages defined by bore 19a and hole 20a and by bore 19b and hole 20b, respectively. It is to be noted that the viscous resistance to the flow of air in such air passages is proportional to the velocity of the air flow. Further, it will be noted that the resonance frequency of the phonograph record 22 at which the latter would be induced to vibrate by reason of the force exerted by cartridge 13c on the record during a reproducing operation is very high. Therefore, such vibration of the phonograph record at its resonance frequency while in close contact with record support members 15a and 15b would tend to cause correspondingly high frequency changes in the volumes of the enclosed spaces $b$. Such high frequency changes in the volumes of spaces b result in very high velocity air flows in the respective air passages, so that large viscous resistance is encountered for damping the vibration of record 22 at its resonance frequency. Therefore, vertical vibrations of the phonograph record 22 are avoided, and cartridge 13c picks up only vibrations corresponding to the sounds recorded on the phonograph record. The foregoing is particularly important in the case of stereophonograph records, as it ensures that the recorded right-hand and left-hand signals can be effectively separated.

Figure 5:
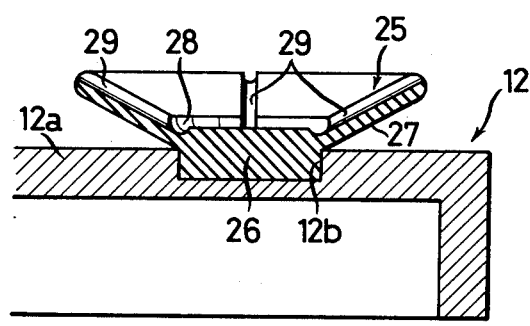
FIG. 5 is an enlarged cross-sectional view similar to that of FIG. 3, but showing a record support member according to another embodiment of this invention.
Figure 6:
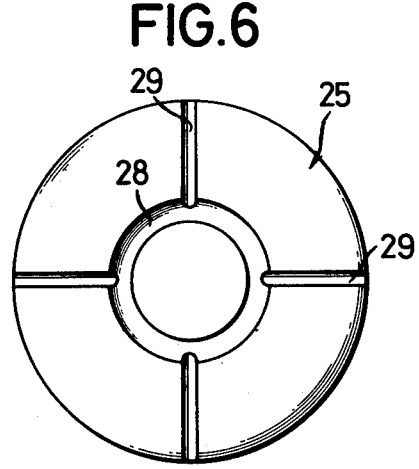
FIG. 6 is a plan view of the record support member shown on FIG. 5.

Referring now to FIGS. 5 and 6, it will be seen that a record support member 25 according to another embodiment of this invention may be similar to the previously described record support member 15a and similarly formed with a central lower portion 26 which is pressed into the respective recess 12b of turntable 12a, and a relatively raised peripheral portion 27 which flares upwardly from central portion 26. Such flaring peripheral portion 27 is again formed with an annular groove 28 adjacent its root and, in this case, air passages are defined by radial grooves 29 formed in the upper surface of peripheral portion 27 and extending outwardly from annular groove 28 to the edge of peripheral portion 27.

As in the case of the record support members 15a and 15b of FIG. 4, when a record is placed on a turntable assembly provided with record support members of the type shown on FIGS. 5 and 6, each record support member 25 functions in the same manner as described above with reference to the record support members 15a and 15b so as to compliantly contact the undersurface of the phonograph record even though the latter may be warped, and further to define an enclosed space between its flaring peripheral portion 27 and the portion of the undersurface of the phonograph record within the edge of such peripheral portion 27. Such enclosed space then communicates with the atmosphere through the radial grooves 29 or air passages within which there is large viscous resistance to high velocity air flow for damping any vertical vibration of the phonograph record at its resonance frequency.

Figure 7:
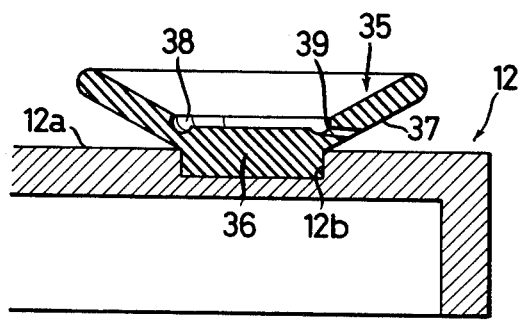
FIG. 7 is an enlarged cross-sectional view similar to that of FIG. 3, but showing a record support member according to still another embodiment of this invention.

Referring now to FIG. 7, it will be seen that an elastically flexible record support member 35 according to another embodiment of this invention is also generally similar to the previously described record support member 15a, and hence is provided with a relatively thick central lower portion 36 frictionally secured in the respective circular recess 12b of turntable 12a, and a relatively thin peripheral portion 37 which flares upwardly from central lower portion 36. As before, the flaring peripheral portion 37 of record support member 35 has an annular groove 38 in its upper surface adjacent the root of peripheral portion 37. However, in the case of record support member 35, at least one air passage is defined by a perforation or bore extending outwardly from annular groove 38 through peripheral portion 37 so as to open at the downwardly facing surface of peripheral portion 37 above turntable 12a. The operation of a turntable assembly provided with record support members 35 is substantially the same as that previously described except that, in this case, the vibration damping effect results from the viscous resistance to the flow of air through the perforation 39.

Figure 8:
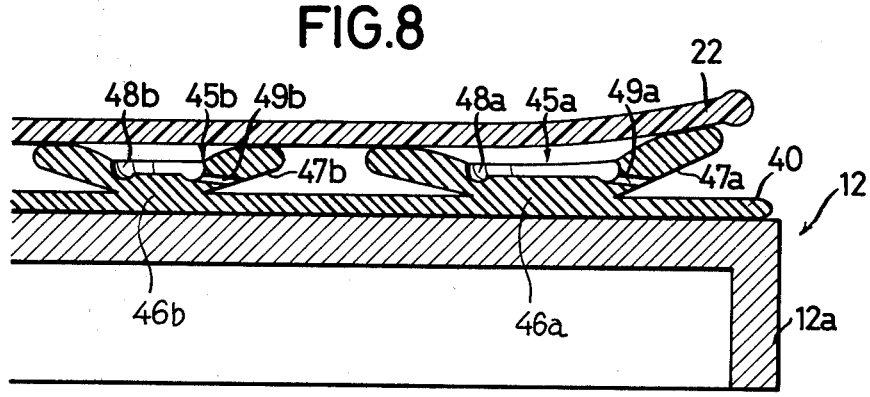
FIG. 8 is an enlarged cross-sectional view similar to that of FIG. 4, but showing a turntable assembly according to a further embodiment of this invention.

In all of the above described embodiments of the invention, the several record support members 15a, 15b, 25 or 35 have been individually mounted in respective recesses 12b opening at the upper surface of turntable 12a. However, such record support members may be formed integrally with a circular mat which is merely placed upon, or otherwise secured to the upper surface of the turntable. For example, as shown particularly on FIG. 8, record support members 45a and 45b which are generally similar to the record support member 35 of FIG. 7, may have their respective relatively thick central lower portions 46a and 46b formed as integral parts of a circular rubber mat 40, while their respective flaring peripheral portions 47a and 47b extend upwardly and outwardly from such central lower portions 46a and 46b. Further, the flaring peripheral portions 47a and 47b have annular grooves 48a and 48b, respectively, in their upper surfaces, and air passages are provided by perforations 49a and 49b extending radially outward from annular grooves 48a and 48b through peripheral portions 47a and 47b, respectively, so as to open at the downwardly facing surfaces of such peripheral portions above mat 40. It will be apparent that the record support members 45a and 45b are disposed on mat 40 in arrays similar to those of the record support members 15a and 15b, respectively, on FIGS. 1 and 2, so as to be capable of fully supporting a phonograph record 22, even though the latter is warped, as shown on FIG. 8. Although the air passages 49a and 49b extend radially outward through the respective peripheral portions of the record support members in the embodiment shown on FIG. 8, it will be apparent that the record support members integral with mat 40 may alternatively be of the type described above with reference to FIGS. 5 and 6, that is, record support members having radially extending grooves in their upper surfaces which open to the atmosphere at the edges of the respective record members.

Figure 9:
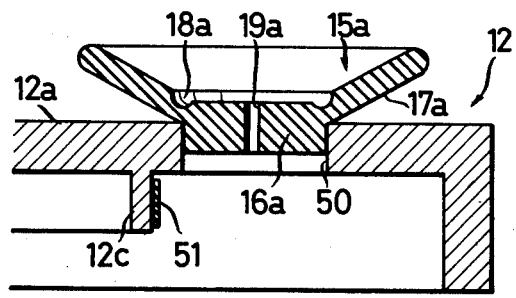
FIG. 9 is an enlarged cross-sectional view of a turntable assembly for phonograph records according to a still further embodiment of this invention.

Referring now to FIG. 9, it will be seen that the turntable 12a of a turntable assembly 12 according to this invention may be provided with a depending circular flange 12c which is adapted to be engaged by a belt 51 for driving the turntable from a drive motor (not shown). It will be apparent that the engagement of drive belt 51 about depending flange 12c presents a problem, as such engagement has to be effected after turntable 12a has been installed on spindle 14, at which time only small clearance exists between the skirt extending along the outer periphery of the turntable and the top surface or deck of cabinet 11 on FIG. 1. Therefore, in accordance with this invention, one or more of the recesses 12b of FIGS. 3, 5 and 7 provided for the mounting of the record support members in the outer circular array is replaced by a hole 50 which extends through turntable 12a adjacent the outer surface of flange 12c. Such hole 50 is diametrically dimensioned to receive the central lower portion of the respective record support member, for example, the portion 16a of a record support member 15a, as shown on FIG. 9. Therefore, when it is desired to effect engagement of belt 51 with flange 12c, each of the record support members 15a mounted in a hole 50 may be removed from the latter, whereupon access is provided through the hole or holes 50 to the underside of the turntable for manipulating belt 51 onto flange 12c. Although FIG. 9 shows the record support member associated with hole 50 to be of the type shown on FIGS. 3 and 4, it will be apparent that such record support member may be of the types indicated at 25 and 35 on FIGS. 5 and 7, respectively.

Having described several illustrative embodiments of the invention with reference to the accompanying drawings, it is to be understood that the invention is not limited to those precise embodiments, and that various changes and modifications may be effected therein by one skilled in the art without departing from the scope and spirit of the invention as defined in the appended claims.

What is claimed is:

1. A phonograph turntable assembly comprising: a rotatable turntable and a plurality of support means on said turntable for supporting a phonograph record, each of said support means being of an elastically flexible material and shaped as an upwardly dished member having a central lower portion mounted on said turntable and a relatively raised upwardly facing peripheral portion of larger diameter than the lower portion thereof, the peripheral portion of each of said support means being flexibly vertically engageable with the undersurface of a phonograph record to cooperate with the undersurface of a phonograph record supported thereon for defining air space therebetween, and each of said record support means having means defining at least one air passage of small cross-sectional area through which said space communicates with the atmosphere outside of said space such that if said record tends to vibrate vertically, the volume of said defined air space changes to produce high viscous resistance of air flowing through said passage to damp said vertical vibrations of said record.

2. A phonograph record turntable assembly according to claim 1; in which said means defining at least one air passage is formed in said dished member.

3. A phonograph record turntable assembly according to claim 2; in which said means defining at least one air passage includes at least one groove in the upwardly facing surface of said dished member opening at the edge of said peripheral portion of the latter.

4. A phonograph record turntable assembly according to claim 2; in which said means defining at least one air passage includes at least one perforation in said peripheral portion of the dished member.

5. A phonograph record turntable assembly according to claim 1; in which said plurality of record support means are arranged in a plurality of circular arrays concentric with said turntable, and the dished circular members of said record support means in one of said circular arrays having a diameter different from the diameter of said dished circular members of said record support means in another of said circular arrays.

6. A phonograph record turntable assembly according to claim 5, in which said plurality of record support means are arranged in a plurality of circular arrays concentric with said turntable, and the record support means in one of said circular arrays are staggered, in the circumferential direction of the turntable, relative to the record support means in another of said arrays.

7. A phonograph record turntable assembly according to claim 1 comprising: a mat mounted on said turntable, the central lower portion of each of said support means being formed integrally with said mat for mounting said support means on said turntable.

8. A phonograph turntable assembly comprising: a rotatable turntable and a plurality of support means on said turntable for supporting a phonograph record, each of said support means being of an elastically flexible material and shaped as an upwardly dished member having a central lower portion mounted on said turntable and a relatively raised upwardly facing peripheral portion of larger diameter than the lower portion thereof, the peripheral portion of each of said support members being flexibly vertically engageable with the undersurface of a phonograph record to cooperate with the undersurface of a phonograph record supported thereon for defining air space therebetween, and each of said record support means having means defining at least one air passage of small cross-sectional area through which said space communicates with the atmosphere outside of said space to produce high viscous resistance of air flowing through said passage and to damp vertical vibrations of said record, said means defining at least one air passage includes a bore extending through said central lower portion of the dished member; and said rotatable turntable is provided with a plurality of holes for the respective support means, each said air passage in said support means being in communication with an associated hole.

9. A phonograph turntable assembly comprising: a rotatable turntable and a plurality of support means on said turntable for supporting a phonograph record, each of said support means being of an elastically flexible material and shaped as an upwardly dished member having a central lower portion mounted on said turntable and a relatively raised upwardly facing peripheral portion of larger diameter than the lower portion thereof, the peripheral portion of each of said support means being flexibly vertically engageable with the undersurface of a phonograph record to cooperate with the undersurface of a phonograph record supported thereon for defining air space therebetween, each of said record support means having means defining at least one air passage of small cross-sectional area through which said space communicates with the atmosphere outside of said space to produce high viscous resistance of air flowing through said passage and to damp vertical vibrations of said record; and in which said turntable has a depending circular flange radially inwardly spaced from the perimeter of said turntable and adapted to be engaged by a drive belt for rotating the turntable, and at least one hole in said turntable radially outwardly of said flange but adjacent to said flange and through which access may be had to said flange from above said turntable for engaging the belt with said flange; and wherein said central lower portion of the dished member constituting at least one of said record support means extends into said hole of the turntable to engage the edge defining said hole for mounting the respective record support means on the turntable, the air passage of the respective record support means being in communication with said hole.

* * * * *